United States Patent
Topolenski et al.

(10) Patent No.: US 12,030,006 B2
(45) Date of Patent: Jul. 9, 2024

(54) SELF-SUPPORTING PLEATABLE FIBROUS WEB ESPECIALLY USEFUL AS OIL FILTER MEDIA AND OIL FILTER COMPRISING THE SAME

(71) Applicant: Ahlstrom Oyj, Helsinki (FI)

(72) Inventors: David Alan Topolenski, Madisonville, KY (US); Crawford Garland Arrington, IV, Mt. Juliet, TN (US)

(73) Assignee: Ahlstrom Oyj, Helsinki (FI)

( * ) Notice: Subject to any disclaimer, the term of this patent is extended or adjusted under 35 U.S.C. 154(b) by 0 days.

(21) Appl. No.: 18/055,641

(22) Filed: Nov. 15, 2022

(65) Prior Publication Data
US 2023/0081040 A1    Mar. 16, 2023

Related U.S. Application Data

(63) Continuation of application No. 15/523,541, filed as application No. PCT/EP2015/075318 on Oct. 30, 2015, now abandoned.
(Continued)

(30) Foreign Application Priority Data

Nov. 28, 2014  (FI) ..................................... 20146043

(51) Int. Cl.
*B01D 39/18*    (2006.01)
*B01D 39/16*    (2006.01)
(Continued)

(52) U.S. Cl.
CPC ........... *B01D 39/163* (2013.01); *B01D 39/18* (2013.01); *B01D 39/2024* (2013.01);
(Continued)

(58) Field of Classification Search
CPC ...... B01D 39/00; B01D 39/08; B01D 39/083; B01D 39/14; B01D 39/16; B01D 39/1607; B01D 39/1615; B01D 39/1623; B01D 39/18; B01D 2239/00; B01D 2239/02; B01D 2239/0208; B01D 2239/06; B01D 2239/0604; B01D 2239/065;
(Continued)

(56) References Cited

U.S. PATENT DOCUMENTS

2009/0324926 A1 * 12/2009 Luo .................... B32B 5/022
                                                                                428/311.71
2010/0187171 A1 *  7/2010 Gupta ..................... D21F 11/14
                                                                                210/491

* cited by examiner

*Primary Examiner* — Allison G Fitzsimmons
(74) *Attorney, Agent, or Firm* — Sisson & Banyas, Attorneys at Law, LLC; Jeffrey J. Banyas

(57) ABSTRACT

Fibrous filtration media for hot oil filtration includes a nonwoven fibrous web containing synthetic fibers and at least about 15 wt. %, based on total weight of the fibrous web, of a binder component selected from thermoset binder resins and/or binder fibers. The synthetic fibers of the fibrous web will contain from about 2 wt. % to about 65 wt. %, for example between about 10 wt. % to about 50 wt. %, based on total weight of fibers in the fibrous web, of thermoplastic synthetic microfibers having an average diameter of less than 5 μtrl. The synthetic fibers are bonded together with the binder component to form the fibrous web which is capable of forming a self-supporting, pleated oil filter media which retains pleats upon contact with oil having a temperature in a range encountered in an internal combustion engine.

19 Claims, 1 Drawing Sheet

Related U.S. Application Data

Figure 1:
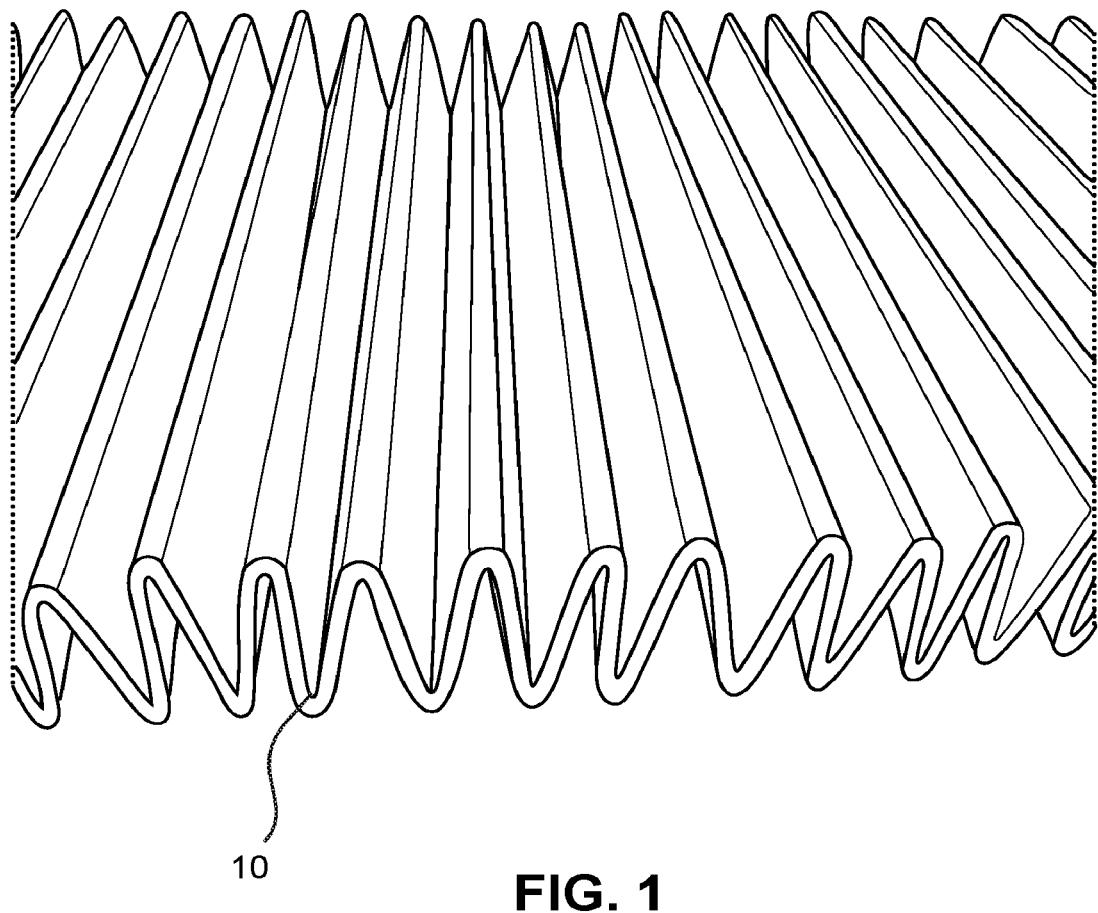

(60) Provisional application No. 62/073,066, filed on Oct. 31, 2014.

(51) Int. Cl.
*B01D 39/20* (2006.01)
*B32B 23/00* (2006.01)

(52) U.S. Cl.
CPC .... *B01D 2239/025* (2013.01); *B01D 2239/04* (2013.01); *B01D 2239/086* (2013.01); *B01D 2239/10* (2013.01); *B01D 2239/1216* (2013.01); *B01D 2239/1233* (2013.01); *B01D 2239/1291* (2013.01)

(58) Field of Classification Search
CPC ...... B01D 2239/0654; B01D 2239/086; B01D 2275/00; B01D 2275/10; B32B 23/00; B32B 23/02; B32B 23/04; B32B 23/044; B32B 23/10
See application file for complete search history.

SELF-SUPPORTING PLEATABLE FIBROUS WEB ESPECIALLY USEFUL AS OIL FILTER MEDIA AND OIL FILTER COMPRISING THE SAME

CROSS-REFERENCE TO RELATED APPLICATIONS

This application is based on and claims priority from U.S. Provisional Application Ser. No. 62/073,066 filed on Oct. 31, 2014, Finish Application No. 20146043 filed on Nov. 28, 2014, International Application No. PCT/EP2015/075318 filed on Oct. 30, 2015, and U.S. application Ser. No. 15/523,541 filed on May 1, 2017 the entire contents of each such application being expressly incorporated herein by reference.

FIELD

The embodiments disclosed herein relate generally to webs for oil filters. In particular, the embodiments disclosed herein relate to filtration media formed from synthetic fibers and at least one thermoset binder, wherein the fibers are bonded with the thermoset binder to form a web, and to methods of producing such webs as well as to self-supporting pleated oil filters produced from the webs.

BACKGROUND

Oil filters intended for use in combustion engines conventionally comprise filter media with fibers obtained from wood pulp. Such wood pulp fibers are typically 1 to 7 millimeters long and 15 to 45 microns in diameter. Natural wood pulp has largely been the preferred raw material for producing filtration media due to its relatively low cost, processability, various mechanical and chemical properties, and durability in the end application. The filter media are pleated to increase filtration surface area transversally to the direction of the oil flow.

Conventional oil filter are typically comprised of a pleated sheet of filtration media and a backing structure. Conventional filtration media exhibit relatively low stiffness and has poor mechanical strength in terms of tensile strength and burst strength. The filtration media sheet of a conventional oil filter are therefore used together with a metal mesh or other type of support structure, which forms a backing for the filtration media sheet and assists in maintaining the pleat shape when used in the end application. Nevertheless, in view of the low mechanical strength, the filtration media sheet tends to burst over time on exposure to engine oil at the temperatures typically encountered in a combustion engine, e.g., temperatures of about 125° C. to about 135° C.

Although filtration media products that are produced largely with wood pulp are still an excellent choice for most automotive and heavy duty oil filtration applications, there is a growing market demand for oil filtration products that exhibit increased strength and durability over time as the media is exposed to the various chemical, thermal, and mechanical stresses of the end application environment. This demand stems from both harsher end application conditions that the media is exposed to as well as increasing demand for filtration media that can be safely used in the end application for increasingly longer amounts of time without rupturing or failing.

The long-standing and widely applied solution to this demand has been to incorporate some minor quantity of synthetic fiber, typically a polyester such as polyethylene terephthalate (PET), in an amount of about 5-20 wt. %. The result of fortifying the fiber furnish in this way is higher media strength as well as enhanced chemical and mechanical durability when the media is exposed to the end application environment, due to the superior chemical, thermal, and mechanical durability of the synthetic fibers themselves. By incorporating the synthetic PET fibers in these small amounts, the media performance is somewhat enhanced while still being able to produce a media that is both pleatable and self-supporting.

None of the currently known prior art in the areas of air filters and/or fuel filtration media discloses a filter medium capable of forming a self-supporting oil filter when configured into a pleated structure and which would be capable of working properly at the harsh conditions in connection with an internal combustion engine (e.g., temperatures of about 125° C. to about 135° C.).

In fact, the known filtration media containing a high percentage of synthetic fibers are not pleatable or self-supporting as such, and have to be co-pleated and reinforced with some sort of additional mechanical support layer, such as a plastic or wire mesh backing. Media made with high levels of synthetic fiber typically tend to exhibit drape and lack sufficient stiffness and rigidity causing the pleats to collapse without an additional support. Moreover, prior proposals for a 100% synthetic media cannot maintain a grooving pattern, like corrugation or a pleated structure, due to the thermal and mechanical properties of the synthetic fibers.

It would therefore be highly desirable if a fibrous filtration medium was provided that could be formed into a self-supporting oil filter when configured into a pleated structure and which would possess the necessary physical properties to be capable of working properly at the harsh conditions encountered in use with an internal combustion engine (e.g., temperatures of about 125° C. to about 135° C.). It is therefore towards fulfilling such desirable attributes that the embodiments disclosed herein are directed.

SUMMARY OF EXEMPLARY EMBODIMENTS

According to one aspect, the embodiments disclosed herein provide a fibrous filtration media for hot oil filtration which includes a nonwoven fibrous web comprising synthetic fibers and at least about 15 wt. %, based on total weight of the fibrous web, of a binder component selected from the group consisting of a thermoset binder resin and binder fibers. The synthetic fibers of the fibrous web will comprise from about 2 wt. % to about 65 wt. %, for example between about 10 wt. % to about 50 wt. %, based on total weight of fibers in the fibrous web, of thermoplastic synthetic microfibers having an average diameter of less than 5 µm. The synthetic fibers are bonded together with the binder component to form the fibrous web which is capable of forming a self-supporting, pleated oil filter media which retains pleats upon contact with oil having a temperature in a range encountered in an internal combustion engine.

The fibrous web may have a mean flow pore size of 25 µm or less, for example 20 µm or less and a hot oil burst strength of at least 20 psi, for example at least about 25 psi (e.g., between about 25 to about 50 psi or more) when measured after 144 hours in hot oil at 140° C.

Some embodiments of the fibrous we will include at least about 10 wt. %, based on total weight of the fibrous web, of cellulosic staple fibers, e.g., lyocell staple fibers.

The binder fibers which may be present in the fibrous web are preferably selected from the group consisting of bicomponent binder fibers, polyethylene terephthalate (PET) binder fibers and polyvinylalcohol (PVOH) binder fibers. Certain embodiments will have binder fibers present in an amount of 0.1 to 25 wt. %, for example, between about 1 to about 20 wt. %, based on the total weight of the fiber web (i.e., the total weight of the fibrous component(s) and the binder component(s)).

A binder resin is typically present to bind the fibers to one another. In certain embodiments, the fibrous web will include a thermoset binder resin in an amount of between about 15 wt. % to about 30 wt. %, based on the total weight of the fibrous web (i.e., the total weight of the fibrous component(s) and the binder component(s)). The thermoset binder resin may be at least one selected from the group consisting of phenolic resins, epoxy resins, melamine-based resins, and acrylic resins.

The synthetic fibers may additional comprise basic thermoplastic staple fibers having an average fiber diameter of greater than 5 μm. These basic thermoplastic fibers may be one or more selected from the group consisting of polyesters, polyalkylenes, polyacrylonitriles, polyamides and mixtures thereof, for example one or more of polyethylene terephthalate (PET), polybutylene terephthalate (PBT), polyethylene (PE), polypropylenes (PP), nylon-6, nylon 6,6, nylon-6,12, and combinations thereof.

The fibrous web may be glass-free (i.e., not contain any glass fibers) or may contain some amount of glass fibers, e.g, between about 2.5 wt. % to about 20 wt. % or even up to about 50 wt. % of glass fibers. If present, the glass fibers may be microfibers having an average diameter of between about 0.2 μm to about 5 μm.

Certain embodiments of the fibrous web will have an average thickness of between about 0.6 mm to about 1.5 mm, a basis weight of between 50 and 400 gsm, an air permeability of between about 2 to about 600 cfm/sf and a hot oil burst strength of at least 20 psi after 144 hours in hot oil at a temperature of 140° C.

One specific embodiment of the fibrous web will include:
between about 10 wt. % to about 50 wt. %, based on total weight of fibers, of the thermoplastic microfibers;
at least about 10 wt. % based on total weight of the fibers of cellulosic fibers; and
between about 15 wt. % to about 30 wt. %, e.g., about 25 wt. %, based on total weight of the fibrous web of a thermoset binder resin selected from the group consisting of phenolic resins, epoxy resins and melamine resins.

The fibrous webs of the embodiments disclosed herein may be made by conventional wet-laid sheet techniques whereby a fibrous slurry comprised of synthetic fibers having from about 2 wt. % to about 65 wt. %, e.g., from about 10 to about 50 wt. %, based on total weight of fibers in the sheet, of thermoplastic synthetic microfibers having an average diameter of less than 5 μm are dewatered. Subsequently a binder resin may be saturated into the wet laid sheet and cured so as to bond the synthetic fibers one to another and form a fibrous web capable of forming a self-supporting, pleated oil filter media which retains pleats upon contact with oil having a temperature in a range encountered in an internal combustion engine (e.g., typically between a temperature of about 125° C. to about 135° C.

These and other attributes of the various embodiments according to the invention will be better understood by reference to the following detailed descriptions thereof.

BRIEF DESCRIPTION OF ACCOMPANYING DRAWINGS

Accompanying FIG. 1 depicts an exemplary non-limiting pleated self-supporting fibrous web according to an embodiment of the invention disclosed herein.

DEFINITIONS

As used herein and in the accompanying claims, the terms below are intended to have the definitions as follows.

"Fiber" is a fibrous or filamentary structure having a high aspect ratio of length to diameter.

"Staple fiber" means a fiber which naturally possesses or has been cut or further processed to definite, relatively short, segments or individual lengths.

"Fibrous" means a material that is composed predominantly of fiber and/or staple fiber.

The terms "non-woven" or "web" mean a collection of fibers and/or staple fibers in a web or mat which are randomly interlocked, entangled and/or bound to one another so as to form a self-supporting structural element.

The terms "synthetic fiber" and/or "man-made fiber" refer to fibers made from fiber-forming substances including polymers synthesized from chemical compounds, modified or transformed natural polymer and silicious (glass) materials. Such fibers may be produced by conventional melt-spinning, solution-spinning, solvent-spinning and like filament production techniques.

A "cellulosic fiber" is a fiber composed of or derived from cellulose.

The terms "saturated dried cured" or "SDC" means a media saturated with a binder resin, preferably a thermoset binder resin, which is air-dried or dried with heat for a time sufficient to evaporate the solvent from the resin and cured in a hot air oven, e.g., at 350° F. (177° C.) for 5 minutes.

The terms "self-supporting pleatable web" or "self-supporting pleated filter media" is meant to reference a web or a filter media which when pleated includes pleats having sufficient stiffness that do not collapse or bow excessively when subjected to oil pressure typically encountered in combustion engines. In one preferred embodiment, the web can be provided with pleats having a sharp angle of less than 30°, in particular less than 25°. Typically, a "pleatable" web will be capable of being formed into pleats and retaining them, preferably over the entire time of operational service of the filter.

The terms "corrugation" or "grooving" have the meaning commonly used in the art as relating to a surface structure of alternate ridges or grooves and is typically applied in a direction perpendicular to the pleat direction in order to further increase the effective surface area of the web without the necessity of increasing the outer dimensions of the web. Preferably, the corrugation depth (or grooving depth) is about 0.1-0.6 mm. The "corrugation depth" relates to the difference between the caliper (or thickness) of the flat sheet of medium and the thickness of the sheet after corrugating the medium. Corrugation is particularly important in coiled filter arrangements of pleated filters in which the pleats extend parallel to the central axis of the coiled filter arrangement. As the number of pleats increases within a given volume, the pleats come to lie in close abutment against one another, in particular on the outflow side of the filter, thereby reducing the flow rate of the medium to be filtered and consequently increasing flow resistance of the filter arrangement. Thus, corrugation allows for an undisturbed, more uniform flow of the medium to be filtered by increasing the rate of flow compared to a non-corrugated filter.

The term "thermoplastic" means a plastic which becomes pliable or moldable above a specific temperature and returns to a solid state upon cooling. Exemplary thermoplastic fibers suitable for the present embodiments include polyesters (e.g., polyalkylene terephthalates such as polyethylene terephthalate (PET), polybutylene terephthalate (PBT) and the like), polyalkylenes (e.g., polyethylenes, polypropylenes and the like), poyacrylonitriles (PAN), and polyamides (nylons, for example, nylon-6, nylon 6,6, nylon-6,12, and the like). Preferred are PET fibers which exhibit good chemical and thermal resistance which are properties of importance for the use of the media as oil filters.

The term "silicious" fibers primarily means "glass" fibers, such as glass microfibers. Such fibers are typically staple fibers and generally have an aspect ratio (ratio of length to diameter) of between about 200 to about 1000 or more. Preferred glass microfibers will thus have an average diameter from about 0.1 µm to about 5 µm (typically from about 0.4 µm to about 2.6 µm), and an average length from 20 µm to about 5 mm. Mixtures of different diameters of glass microfibers, e.g., relatively larger glass microfibers with an average diameter of about 2.5 µm±about 0.1 µm with relatively smaller glass microfibers with an average diameter of about 0.5 µm±about 0.1 µm may be employed.

DETAILED DESCRIPTION

An exemplary pleated self-supporting fibrous web 10 according to the embodiments disclosed herein is shown in FIG. 1. The pleats of the web 10 may form a relatively sharp angle of less than 30°, in particular less than 25°. The web 10 comprises or consists of a the components as described hereinbelow.

A. Synthetic Fibers

The fibrous web will necessarily comprise synthetic fibers which include between about 5 wt. % to about 65 wt. %, for example between about 10 wt. % to about 50 wt. %, based on total weight of fibers in the fibrous web, of thermoplastic microfibers having an average diameter of less than 5 µm will necessarily be employed in the fibrous webs as herein described. In preferred embodiments, the thermoplastic microfibers may be substantially round cross-sectionally shaped microfibers with an average diameter of about 2.5 µm having lengths of about 1.0 to about 2.0, typically about 1.5 mm. The thermoplastic microfibers may be those as described more completely in U.S. Pat. Nos. 8,179,199 and 8,513,147 as well as US Published Patent Application No. 2012/0175298, the entire content of each being expressly incorporated hereinto by reference.

One especially preferred thermoplastic microfiber that may be employed in the fibrous webs disclosed herein is commercially available from Eastman Chemical Company of Kingsport, TN under the tradename CYPHREX™ 10001 PET microfiber. Such a preferred thermoplastic microfiber will have a substantially round 2.5 µm diameter cross-section and a 1.5 mm length.

Other larger sized thermoplastic staple fibers (i.e., thermoplastic staple fibers having an average diameter of greater than 5.0 µm and hereinafter termed "basic synthetic staple fibers") may also be employed in admixture with the thermoplastic microfibers in amounts ranging from about 10 wt. % to about 65 wt. %, typically between about 14 wt. % to about 45 wt. %, based on the total weight of fibers in the fibrous media.

Exemplary thermoplastic fibers suitable for the fibrous media of the present embodiments include polyesters (e.g., polyalkylene terephthalates such as polyethylene terephthalate (PET), polybutylene terephthalate (PBT) and the like), polyalkylenes (e.g., polyethylenes, polypropylenes and the like), poyacrylonitriles (PAN), and polyamides (nylons, for example, nylon-6, nylon 6,6, nylon-6,12, and the like).

Preferred for use as the basic synthetic stable fibers are PET fibers having average fiber diameters of between about 5.0 µm to about 15 µm, typically between about 5.5 µm to about 12.5 µm, having staple fiber lengths of between about 5 mm to about 10 mm, typically between about 5 mm to about 6.5 mm may be employed. Mixtures of PET fibers having different average fiber diameters may also advantageously be employed. For example, a mixture of PET staple fibers may be employed having the following components: (a) between about 5 wt. % to about 25 wt. %, typically between about 15 wt. % to about 20 wt. % of PET staple fibers having an average fiber diameter of about 5.5 µm, (b) between about 2 wt. % to about 15 wt. %, typically between about 5 wt. % to about 10 wt. % of PET staple fibers having an average fiber diameter of about 9.0 µm, and (c) between about 10 wt. % to about 40 wt. %, typically between about 15 wt. % to about 25 wt. % of PET staple fibers having an average fiber diameter of about 12.4 µm may be employed, all weight percentages being based on the total fiber weight.

Preferred PET staple fibers that may be satisfactorily employed as the basic synthetic staple fibers of the fibrous media herein are commercially available, such as those PET staple fibers having 0.3 denier and a staple length of about 5 mm as well as PET staple fibers having 0.8 denier and a staple length of about 6 mm commercially available from William Barnet and Son, LLC of Spartenburg, South Carolina, and RECRON® PET staple fibers having 1.5 denier and a staple length of about ¼-inch commercially available from Reliance Industries Limited of Mumbai, India.

The synthetic fibers may also include between about 15 wt. % to about 50 wt. %, typically between 30 wt. % to about 40 wt. % of a regenerated cellulosic fiber, preferably lyocell staple fibers. The cellulosic staple fibers most preferably will have an average diameter of about 25 µm or less, typically 15 µm or less, e.g., between about 10 µm to about 15 µm. The average length of the cellulosic staple fibers is typically between about 1 mm to about 8 mm, or between about 2 mm to about 6 mm, or about 3 mm to about 4 mm.

Preferred lyocell fibers are commercially available from Engineered Fibers Technology, LLC of Shelton, CT under the tradename TENCEL® lyocell fibers which have about 1.7 denier and about 4 mm staple length.

Glass microfibers may also optionally be present in admixture with the other synthetic fibers as previously described in amounts sufficient to improve efficiency of the fibrous media as a filter. Typically, the glass microfibers, if present, will be employed in amounts of up to about 40 wt. %, typically up to about 22 wt. %, based on total weight of the fibers in the fibrous media. Glass microfibers having an average fiber diameter of between about 0.2 µm to about 5 µm, typically between about 0.5 µm to about 2.5 µm±about 0.1 µm, may be employed. Preferred glass microfibers for the fibrous media of the embodiments described herein may be commercially obtained as C06 glass fibers (average fiber diameter of 0.65 µm) and C26 glass fibers (average fiber diameter of 2.6 µm) from Lauscha Fiber International of Summerville, SC.

B. Binder Component

The fibrous web 10 will also necessarily include a binder component comprised of a binder resin and/or binder fibers. In preferred embodiments, both a binder resin and binder fibers are employed.

Virtually any binder resin that is employed for use in filtration media may be employed in the fibrous webs of the embodiments disclosed herein. Suitable examples of binder resins that may be employed include polymers such as styrene acrylic, acrylic, polyethylene vinyl chloride, styrene butadiene rubber, polystyrene acrylate, polyacrylates, polyvinyl chloride, polynitriles, polyvinyl acetate, polyvinyl alcohol derivates, starch polymers, epoxy, phenolics and combinations thereof, including both waterborne or solvent versions. In some cases, the binder resin may be in the form of a latex, such as a water-based emulsion.

Preferred resin binders include phenolic resins, acrylic resins (e.g., vinyl acrylic latex resins), melamine resins, silicone resins, epoxy resins and the like. One phenolic (phenolformaldehyde) resin that may be employed includes DURITE® SL161A commercially available from Momentive Specialty Chemicals Inc. of Louisville, KY. One suitable latex based resin binder that may be employed is PD 0458 M1 (a polyoxymethylene nonylphenol branched ether phosphate dispersed in formaldehyde) commercially available from HB Fuller Co. of St. Paul, MN. A suitable melamine binder resin may be ASTRO® Celrez PA-70 methylated melamine resin system commercially available from Momentive Specialty Chemicals Inc. of Louisville, KY. Suitable acrylic resins include ACRODUR® formaldehyde-free water-based acrylic resins commercially available from BASF Corporation.

The resin binder may be present in amounts between about 5 wt. % to about 40 wt. % saturated dried cured (SDC) weight of the fibrous web, preferably between about 10 wt. % to about 20 wt. % based on the total saturated dried cured (SDC) weight of the fibrous web. Especially preferred embodiments will include the resin binder in an amount between about 15 wt. % to about 25 wt. % total SDC weight of the fibrous web.

To further improve internal bonding between the synthetic fibers of the fibrous web, suitable binder fibers may be employed. Such fibers typically may comprise bicomponent thermoplastic fibers comprised of a thermoplastic core fiber surrounded by a meltable sheath layer of a thermoplastic polymer which as a lower melting point than the material forming the core. The low melting point thermoplastic polymer of the sheath layer may thus act as a thermoplastic binding agent when softened or partially melted during processing of the fibrous web by heating, thereby adhering to the fibers of the web. The higher melting material forming the core may act as a structural material.

Alternatively or additionally, binder fibers formed of a polyethylene terephthalate (PET) or a polyvinyl alcohol (PVOH) may be employed. These binder fibers have typically a lower melting point than the other synthetic fibers in the furnish, thereby acting as a binding agent when softened or partially surface-melted during processing of the fibrous web by heating. The partially surface-melted or softened binder fibers are therefore capable of internally binding the fibers of the web by adhering to the fibers and structurally strengthening the thus obtained fibrous web. Alternatively, these binder fibers do not melt, but begin to partially dissolve in the solvent used for the manufacturing process (i.e., water) and become tacky. The tacky or softened binder fibers are therefore capable of internally binding the fibers of the web by adhering to the fibers and structurally strengthening the thus obtained fiber web. One preferred source of PVOH binder fibers are the polyvinyl buryral (PVB) fibers commercially available from Kuraray America, Inc. of Houston Texas.

The average fiber diameter of the binder fibers may be preferably in the range of about 2 to 20 μm. e.g., about 10 μm and the average fiber length of the binder fibers may be in the range of about 2 to 12 mm, such as about 3 to about 6 mm, e.g., about 4 mm. The amount of such bicomponent binder fibers in the fibrous web may be between about 0.1 wt. % to about 25 wt. %, for example between about 1 wt. % to about 20 wt. %, such as between about 2 wt. % to about 10 wt. %, based on the total weight of fibers.

C. Optional Additives

The fibrous filtration media may also contain additives conventionally employed in wet-laid filtration media, such as for example, wet strength additives, optical brighteners, fiber retention agents, colorants, separation aides (e.g., silicone additives and associated catalyzers), fire or flame retardants, and the like. If present, these additives may be included in amounts of up to about 50 wt. %, preferably up to about 45 wt. %, for example between about 0.5 wt. % to about 40 wt. %, based on total solids content of the resin binder composition.

D. Methods of Making

The fibrous media described herein may be made by any conventional "wet-laid" paper-making technology. Thus, for example, predetermined amounts of the synthetic fibers and the thermoplastic microfibers (along with any optional components, such as the glass fibers, basic thermoplastic fibers and/or additives) and water may be placed in a pulper or beater. The fibers are mixed and dispersed by the pulper or beater evenly in the water to form a slurry batch. Some mechanical work can also be performed on the fibers to affect physical parameters, such as permeability, surface properties and fiber structure. The slurry batch may thereafter be transferred to a mixing chest where additional water is added and the fibers are homogenously blended. The blended slurry may then be transferred to a machine chest where one or more slurry batches can be combined, allowing for a transfer from a batch to a continuous process. Slurry consistency is defined and maintained by agitation to assure even dispersion of fibers. In this regard, the slurry may optionally be passed through a refiner to adjust physical parameters.

The slurry is then transferred to a moving wire screen where water is removed by means of gravity and suction. As water is removed, the fibers form into a fibrous nonwoven web or sheet having characteristics determined by a number of process variables, including for example, the slurry flow rate, machine speed, and drainage parameters. The formed sheet may optionally be compressed while still wet so as to compact the paper and/or modify its surface characteristics. The wet paper mat is then moved through a drying section comprised of heated rollers (or "cans" in art parlance) where most of the remaining entrained water is removed. The dried web may then have a binder resin applied by any conventional means, such as dipping, spray coating, roller (gravure) application and the like. Heat may then subsequently be applied to dry the web.

If employed as a pleated filtration media, the dried web may advantageously be subjected to machine-direction (longitudinal) grooving using mated male/female rollers. If employed, the media may have about 50 longitudinally extending grooves per 200 mm of media width. Each groove will thus preferably have a nominal width of about 4 mm. A typical grooved oil filter media has dimensions such as overall SD (saturated and dried, but not cured) caliper of about 42 mils, SD groove depth of about 15 mils, and SD optical caliper A (optical measurement of media thickness in one groove, therefore representing corresponding flat thickness) of about 35 mils.

The finished (optionally grooved) filtration media may then be taken up on a roll for further processing into finished filter products. For example, one or more finished filtration media sheets may be laminated with one or more other sheets of material (e.g., at least one additional filtration media layer, supporting layer and the like) to achieve desired physical and performance characteristics. The filtration media may also be pleated and formed into a cylindrical filter cartridge that may then be provided as a component part of a filtration unit for an internal combustion engine, e.g., a filtration unit as shown by U.S. Pat. Nos. 3,288,299 and/or 3,912,631, the entire contents thereof being expressly incorporated hereinto by reference.

The basis weight of the finished filtration media is not critical. Thus, the finished oil filtration media may have a basis weight of at least about 50 grams per square meter (gsm), more preferably at least about 100 gsm up to about 250 gsm. Some embodiments of the filtration media described herein may possess a basis weight of between about 140 gsm up to about 220 gsm.

The present invention will be further illustrated by the following non-limiting examples thereof.

EXAMPLES

1. Procedures

The samples were produced using a laboratory wetlaid hand sheet mold. The furnish as described in the recipe was mixed with 2 liters of tap water and disintegrated with a standard laboratory disintegrator (Noram) for 1500 revolutions. The furnish was then poured into the wetlaid mold and diluted with approx. 25 liters of tap water, stirred 3 times with a pedal stir, and drained through a standard paper machine wire.

The hand sheets were then squeezed dry with a couching roller rolled across 3 times, pre-dried in a flat bed speed oven for 5 minutes at 350° F. and subsequently dried in an oven for 5 minutes at 350° F. Raw physical data such as raw basis weight, caliper, air permeability were taken immediately after oven drying on the oven dried (OD) sheet.

The samples were then saturated with a standard phenolic resin (161A from Momentive Specialty Chemicals, Inc.) at a content of 25 wt. % based on total sheet weight (bath solids of resin bath were 18% in methanol as solvent). The samples were then air dried for 24 hours in ambient conditions, and cured to arrive at the SDC (saturated dried cured) level at 350° F. for 5 minutes. SDC basis weight was recorded immediately after curing, and other SDC data such as SDC caliper and SDC air permeability were measured subsequently.

Compositions of the exemplary fibrous webs having different contents of glass fibers and thermoplastic microfibers are shown in the Table below as Examples 1-8 in comparison to a control media sample having no thermoplastic microfibers.

2. Test Methods

The following test methods were employed to obtain the data reported in the Table below.

Basis Weight: The basis weight (BWT) is measured on the oven dried (OD) unsaturated media and the saturated dried cured (SDC) media sample according to TAPPI Standard T 410 om-02 and reported in grams per square meter (gsm).

Air Permeability: The air permeability of the media is measured according to TAPPI Standard T 251 cm-85 ("Air Permeability of Porous Paper, Fabric and Pulp Handsheets") with 0.5 inch (2.7 mm) water differential using a Textest AG (model FX3300) and reported as the rate of the flow of air in cubic feet per square foot of sample area per minute (cfm/sf), sometimes referred to more simply as cfm.

Mean Flow Pore (MFP) Size: ASTM F-316

Tensile Strength: TAPPI Standard T494.

Burst Strength: The pressure required to rupture a media sample was measured using a MULLEN® burst strength tester according to TAPPI Standard T403. Results are reported in pounds per square inch (psi) at media rupture.

Caliper: The caliper (thickness) of SDC media was measured using a 89-100 Thickness Tester from Thwing-Albert Instrument Company according to TAPPI Standard T411, "Thickness (caliper) of paper, paperboard and combined board" (incorporated fully by reference herein).

Stiffness: Stiffness of OD and SDC media was obtained by TAPPI T489 om-92 using a GURLEY™ bending resistance tester MOD 4171 D (Gurley Precision Instruments).

Tear Strength: TAPPI Standard T-414

Hot Oil Burst Strength: The hot oil burst strength of a media sample is the maximum hydrostatic pressure required to result in rupture of the media sample when a controlled and constantly increasing pressure is applied through a rubber diaphragm to an area of 7.07 cm². Hot oil burst strength was determined by placing a media sample (size 14 cm×10 cm) into an oil bath of typical engine oil (e.g., MOBIL 1™ motor oil) maintained at 140° C.±about 0.1° C. for 144 hours. The media sample is then removed from the hot oil bath and cooled for about 5 minutes with excess oil being blotted from the media sample. The moisture free sample is then tested using a MULLEN® burst strength tester with the results being reported in force per unit area, i.e., pounds per square inch (psi), at media rupture.

TABLE 1

| component | Diameter | Component %: | Control 1 | Ex1 | Ex2 | Ex3 | Ex4 | Ex5 | Ex6 | Ex7 | Ex8 |
| --- | --- | --- | --- | --- | --- | --- | --- | --- | --- | --- | --- |
| PET 0.3 denier*5 mm | 5.5 um | | 16.4% | 16.4% | 16.4% | 16.4% | 16.4% | 16.4% | 12.8% | 9.0% | 5.1% |
| PET 0.8 denier*6 mm | 9.0 um | | 6.6% | 6.6% | 6.6% | 6.6% | 6.6% | 6.6% | 5.1% | 3.6% | 2.0% |
| 1.5 d × ¼" polyester | 12.4 um | | 20.0% | 20.0% | 20.0% | 20.0% | 20.0% | 20.0% | 15.6% | 10.9% | 6.4% |
| PET 2.5 μm × 1.5 mm | 2.5 um | | | 5.0% | 10.0% | 15.0% | 16.5% | 20.5% | 30.0% | 40.0% | 50.0% |
| Lauscha C-26 glass | 2.4 um | | 16.5% | 12.5% | 8.5% | 4.4% | | | | | |
| Lauscha C-06 glass | 0.6 um | | 4.0% | 3.0% | 2.0% | 1.1% | 4.0% | | | | |
| PVOH Fiber 10 um × 4 mm | 10 um | | 2.0% | 2.0% | 2.0% | 2.0% | 2.0% | 2.0% | 2.0% | 2.0% | 2.0% |

TABLE 1-continued

| component | Diameter | Component %: | Control 1 | Ex1 | Ex2 | Ex3 | Ex4 | Ex5 | Ex6 | Ex7 | Ex8 |
|---|---|---|---|---|---|---|---|---|---|---|---|
| Lyocell 1.7 Dt*4 mm | 11.5 um | | 34.5% | 34.5% | 34.5% | 34.5% | 34.5% | 34.5% | 34.5% | 34.5% | 34.5% |
| Resin % | | | 25% | 25% | 25% | 25% | 25% | 25% | 25% | 25% | 25% |
| Total Fibers (%) | | | | | | | | | | | |
| Glass fibers | | | 21% | 16% | 11% | 6% | 4% | 0% | 0% | 0% | 0% |
| Cellulosic | | | 35% | 35% | 35% | 35% | 35% | 35% | 35% | 35% | 35% |
| Basic TP Fibers | | | 43% | 43% | 43% | 43% | 43% | 43% | 34% | 24% | 14% |
| Binder Fibers | | | 2% | 2% | 2% | 2% | 2% | 2% | 2% | 2% | 2% |
| TP Synthetic Microfibers | | | 0.0% | 5.0% | 10.0% | 15.0% | 16.5% | 20.5% | 30.0% | 40.0% | 50.0% |
| Total % | | | 100% | 100% | 100% | 100% | 100% | 100% | 100% | 100% | 100% |

TP = Thermoplastic

| | | UNITS | | | | | | | | | |
|---|---|---|---|---|---|---|---|---|---|---|---|
| Unsaturated Ungrooved OD Handsheet | | | | | | | | | | | |
| BW (OD) | OD | gsm | 157.66 | 158.23 | 157.98 | 158.23 | 158.39 | 158.55 | | 159.12 | 159.04 |
| Air Permeability | OD | cfm/sf | 41.50 | 42.80 | 40.55 | 39.80 | 30.55 | 39.85 | 27.80 | 18.95 | 13.30 |
| Mean Flow Pore (MFP) | OD | um | 20.10 | 21.00 | 21.20 | 19.20 | 16.60 | 19.00 | 15.20 | 13.25 | 10.50 |
| TENSILE | OD | lbsf. | 2.94 | 3.48 | 4.14 | 5.83 | 4.59 | 7.47 | 5.14 | 5.22 | 4.55 |
| CALIPER | OD | mils | 41.38 | 36.95 | 41.81 | 41.99 | 40.15 | 39.07 | 39.94 | 43.39 | 45.66 |
| Burst Strength | OD | psi | 17.50 | 29.50 | 32.50 | 44.00 | 43.50 | 54.75 | 36.00 | 31.75 | 17.00 |
| STIFFNESS | OD | mg | 1,750 | 1800 | 1700 | 2250 | 1500 | 2150 | 2250 | 2800 | 2300 |
| TEAR | OD | gms | 176.0 | 220 | 248 | 400 | 240 | 560 | 440 | 440 | 296 |
| Ungrooved SDC Handsheet | | | | | | | | | | | |
| BW (SDC) | SDC | gsm | 211.51 | 211.51 | 211.51 | 211.51 | 211.51 | 211.51 | | 211.51 | 211.51 |
| Burst Strength (SDC) | SDC | psi | 86.70 | 95.00 | 102.50 | 106.50 | 98.00 | 94.50 | | | |
| STIFFNESS (SDC) | SDC | mg | 22,400 | 27000 | 23400 | 27400 | 23800 | 21600 | | | |
| Hot Oil Burst Strength (SDC) @ 144 hr | SDC | psi | 55.5 | 58.67 | 57.33 | 53.33 | 63.33 | 67.67 | 58.5 | 60.17 | 54.5 |

HD = Handsheet
SDC = Saturated, Dried & Cured

The above data show hot oil burst strength increases as the content of the thermoplastic microfibers having a diameter of less than 5 μm replaces the glass microfibers at comparable mean pore size. That is, a fibrous filtration media may be provided with increased filtration efficiency (i.e., by having comparable mean flow pore sizes) while also achieving an increase in hot oil burst strength. Moreover, an increase in the content of the thermoplastic microfibers enables a 100% glass-free fibrous web to be prepared so as to provide a self-supporting media.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A fibrous filtration media for hot oil filtration which includes a nonwoven fibrous web comprising:
   synthetic fibers; and
   at least about 15 wt. %, based on total weight of the nonwoven fibrous web, of a binder component selected from the group consisting of a thermoset binder resin and binder fibers, wherein
the synthetic fibers comprise from about 2 wt. % to about 65 wt. %, based on total weight of the nonwoven fibrous web, of thermoplastic synthetic microfibers having an average diameter of less than 5 μm, and from 10 to 65 wt. %, based on the total weight of the fibers in the fibrous media, of thermoplastic staple fibers having an average diameter of greater than 5 μm, wherein
the synthetic fibers are bonded together with the binder component to form the nonwoven fibrous web, and wherein the nonwoven fibrous web not being co-pleated and reinforced with an additional mechanical support layer such that the nonwoven fibrous web forms a self-supporting, pleated oil filter media which retains pleats upon contact with oil having a temperature in a range of at least 125° C. to 135° C. encountered in an internal combustion engine.

2. The fibrous filtration media according to claim 1, wherein the synthetic fibers comprise between about 10 wt. % to about 50 wt. %, based on the total weight of fibers, of the thermoplastic microfibers.

3. The fibrous filtration media according to claim 1, having a mean flow pore size of 25 μm or less.

4. The fibrous filtration media according to claim 1, having a hot oil burst strength of at least 20 psi when measured after 144 hour in hot oil at 140° C.

5. The fibrous filtration media according to claim 1, wherein the nonwoven fibrous web further comprises at least about 10 wt. %, based on total weight of the nonwoven fibrous web, of cellulosic staple fibers.

6. The fibrous filtration media according to claim 5, wherein the cellulosic staple fibers comprise lyocell fibers.

7. The fibrous filtration media according to claim 1, wherein the binder fibers are selected from the group consisting of bicomponent binder fibers, polyethylene terephthalate (PET) binder fibers, and polyvinylalcohol (PVOH) binder fibers.

8. The fibrous filtration media according to claim 7, wherein the binder fibers are present in an amount of 0.1 to 25 wt. %, based on total weight of fibers.

9. The fibrous filtration media according to claim 1, wherein the binder component comprises between about 15 wt. % to about 30 wt. %, based on total weight of the fibrous web, of a thermoset binder resin.

10. The fibrous filtration media according to claim 9, wherein the thermoset binder resin is at least one selected from the group consisting of phenolic resins, epoxy resins, melamine-based resins, and acrylic resins.

11. The fibrous filtration media according to claim 1, wherein the thermoplastic staple fibers are selected from the group consisting of polyesters, polyalkylenes, polyacrylonitriles, polyamides, and mixtures thereof.

12. The fibrous filtration media according to claim 11, wherein the thermoplastic staple fibers are selected from the group consisting of polyethylene terephthalate (PET), polybutylene terephthalate (PBT), polyethylene (PE), polypropylenes (PP), nylon-6, nylon 6,6, nylon-6, 12, and combinations thereof.

13. The fibrous filtration media according to claim 1, wherein the synthetic fibers comprise glass microfibers having an average diameter of between about 0.2 μm to about 5 μm.

14. The fibrous filtration media according to claim 1, wherein the fibrous web has an average thickness of between about 0.6 mm to about 1.5 mm.

15. The fibrous filtration media according to claim 1, wherein the fibrous web has a basis weight of between 50 and 400 gsm, a permeability of between about 2 to about 600 cfm/sf and a hot oil burst strength of at least 20 psi after 144 hours in hot oil at a temperature of 140° C.

16. The fibrous filtration media according to claim 1, wherein the fibrous web comprises:
 between about 10 wt. % to about 50 wt. %, based on total weight of fibers, of the thermoplastic microfibers;
 at least about 10 wt. %, based on total weight of the fibrous web, of cellulosic fibers; and
 between about 15 wt. % to about 30 wt. %, based on total weight of the fibrous web, of a thermoset binder resin selected from the group consisting of phenolic resins, epoxy resins, and melamine resins.

17. The fibrous filtration media of claim 1, comprising longitudinally extending and latitudinally separated grooves.

18. The fibrous filtration media of claim 1, wherein the filtration media is pleated.

19. An oil filter unit for an internal combustion engine, said oil filter unit comprising
 a housing having an inlet and an outlet with said fibrous filtration media contained within the housing;
 a fibrous filtration media including a nonwoven fibrous web comprising:
 synthetic fibers; and
 at least about 15 wt. %, based on total weight of the nonwoven fibrous web, of a binder component selected from the group consisting of a thermoset binder resin and binder fibers, wherein
the synthetic fibers comprise from about 2 wt. % to about 65 wt. %, based on total weight of the nonwoven fibrous web, of thermoplastic synthetic microfibers having an average diameter of less than 5 μm, and from 10 to 65 wt. %, based on the total weight of the fibers in the fibrous media, of thermoplastic staple fibers having an average diameter of greater than 5 μm, wherein
the synthetic fibers are bonded together with the binder component to form the nonwoven fibrous web, and wherein the nonwoven fibrous web not being co-pleated and reinforced with an additional mechanical support layer such that the nonwoven fibrous web forms a self-supporting, pleated oil filter media which retains pleats upon contact with oil having a temperature in a range of at least 125° C. to 135° C. encountered in an internal combustion engine.

* * * * *